US012410908B1

(12) United States Patent
Oetjen

(10) Patent No.: US 12,410,908 B1
(45) Date of Patent: Sep. 9, 2025

(54) MAGNETIC LIGHT SYSTEM FOR ILLUMINATING THE MARGINS OF A WINDSHIELD

(71) Applicant: Elusive Technology Inc., Belleville, IL (US)

(72) Inventor: Joseph Oetjen Oetjen, Belleville, IL (US)

(73) Assignee: ELUSIVE TECHNOLOGY, INC., Belleville, IL (US)

( * ) Notice: Subject to any disclaimer, the term of this patent is extended or adjusted under 35 U.S.C. 154(b) by 0 days.

(21) Appl. No.: 19/088,009

(22) Filed: Mar. 24, 2025

Related U.S. Application Data

(60) Provisional application No. 63/652,865, filed on May 29, 2024.

(51) Int. Cl.
*F21V 21/096* (2006.01)

(52) U.S. Cl.
CPC .................................. *F21V 21/096* (2013.01)

(58) Field of Classification Search
CPC ... F21V 21/096; F21V 21/0965; B60Q 1/268; B60Q 3/208
USPC ......................................... 362/503, 504, 398
See application file for complete search history.

(56) References Cited

U.S. PATENT DOCUMENTS

| | | | | |
|---|---|---|---|---|
| 3,296,645 | A | 1/1967 | Shore | |
| 7,225,848 | B2 | 6/2007 | Williams | |
| 7,725,977 | B2 | 6/2010 | Remer | |
| 7,946,301 | B1 | 5/2011 | Walsh | |
| 8,012,280 | B1 | 9/2011 | Thorpe | |
| 8,256,122 | B2 | 9/2012 | Hatfield | |
| 8,523,380 | B1 * | 9/2013 | Grant | F21V 21/096 362/184 |
| 9,192,277 | B1 | 11/2015 | Hughes et al. | |
| 10,179,443 | B2 | 1/2019 | Mendez et al. | |
| 10,198,918 | B2 * | 2/2019 | Avdic | F21V 21/14 |
| 10,384,651 | B2 * | 8/2019 | Kovarik | B60S 1/30 |
| 11,112,097 | B2 | 9/2021 | Park | |
| 2011/0154601 | A1 | 6/2011 | Tong | |
| 2020/0340636 | A1 * | 10/2020 | Bertken | F21V 21/096 |

* cited by examiner

*Primary Examiner* — Thomas M Sember
(74) *Attorney, Agent, or Firm* — Grace J. Fishel

(57) ABSTRACT

A magnetic light system for illuminating a black line around a windshield from the inside of the windshield with an inner magnetic member movable along the black line with an outer magnetic member for use in cutting a window tint. The inner magnetic member has a light guide that channels light from an LED to a diffuser at a curved end that focuses the light on the black line. The magnetic components of the inner and outer magnetic members have magnetic field directionality such that the light guide may be rotated and steered along the black line by the outer magnetic member.

12 Claims, 8 Drawing Sheets

MAGNETIC LIGHT SYSTEM FOR ILLUMINATING THE MARGINS OF A WINDSHIELD

BACKGROUND OF THE INVENTION

Field of the Invention

The present invention relates to a magnetic light system for use in cutting a film for attachment to the inside of a car window.

Brief Description of the Prior Art

When a film is applied to a window of a car, the window is wetted on the outside and a sheet of film pressed against the glass. There is a black rim around the glass on the inside that is visible from the outside of the glass. Ideally the film is precisely cut along the black line and then installed on the inside of the window. The problem is seeing the black line through the film.

What is needed is a light on the inside of the window focused on the black line and moved along the line as the film is cut from the outside. While there have been magnetic light systems proposed in the past (e.g., U.S. Pat. No. 11,112,097), the light was too diffuse to properly see the black line. The present invention provides a light system that shines a bright light more effectively on the black line where it is needed.

SUMMARY OF THE INVENTION

The present invention relates to an improved magnetic light system for illuminating a black line around a windshield from the inside of the windshield. The system includes an inner magnetic member and an outer magnetic member. The inner magnetic member has a light directed into a light guide. The light guide has a diffuser at a distal end for focusing the light on the black line.

In some embodiments the light is a LED and the light guide is an elongated, tapered member with a concave recess with a flat section seated flush in front of the LED to maximize flux. The concave recess is flanked by wing-like side sections at the entrance end of the light guide to minimize light scatter and to attach the light guide to the inner magnetic member.

In other embodiments, the inner and outer magnetic members have a hollow generally cylindrical shape attached to a base plate with magnetic components having a magnetic field with longitudinal directionality. In a specific embodiment a pair of magnets facing magnetically in the same direction are mounted on the base plate. The magnets on the outer magnetic member and the magnets on the inner magnetic member are positioned such their poles are complementary when the bottom plates of the inner and outer members are on opposite sides of the windshield.

In particular cases, the diffuser lines form a grid with a reflective surface on the opposite side of the light guide and the light guide is curved or bent at the distal end to focus the emitted light.

The invention is not limited to be specific features mentioned in this section but relates to all possible combination of features disclosed in the following sections.

BRIEF DESCRIPTION OF THE SEVERAL VIEWS OF THE DRAWINGS

In the accompanying drawings in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figure 13A:
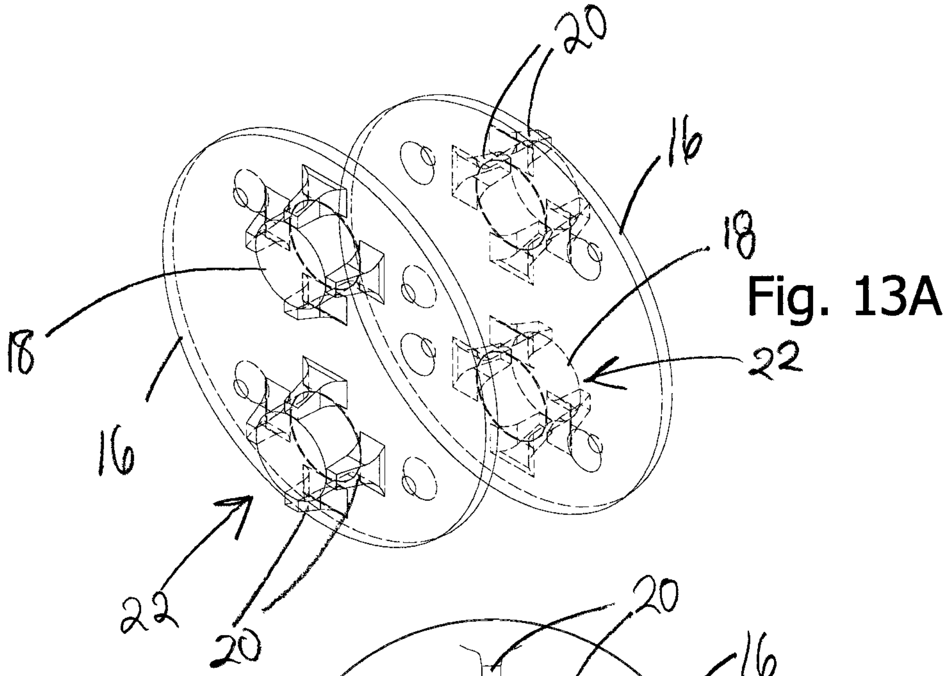
FIG. 13A is an x-ray perspective view of the magnets seated on the bottom plate of the inner and outer magnetic members.
Figure 13B:
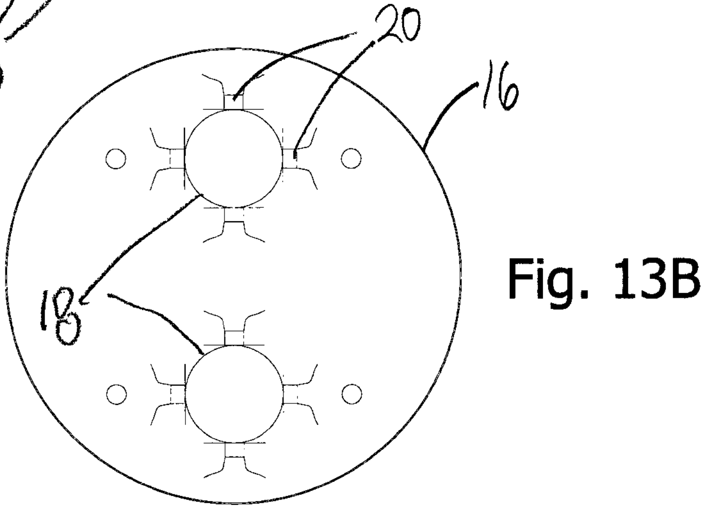
FIG. 13B is a top view of the magnet members seated on the bottom plate.
Figure 13C:
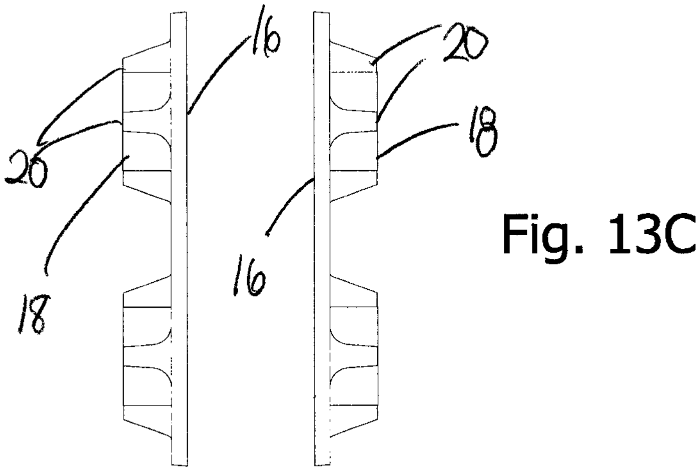
FIG. 13C is a side view of the magnets seated on the bottom plate of the inner and outer magnetic members; and, FIG. 14 is a view of the system in use on a windshield as viewed from the outside.

A magnetic light system comprises an inner magnetic member 10 and an outer magnetic member 12 formed of a plastic material such as ABS or similar material. As shown in the drawings, each of the inner and outer magnetic members 10, 12 comprises a generally cylindrical body with smooth or flattened sides such as a puck 14 attached to a bottom plate 16 on which a magnetic component such as a row of magnets or a bar magnet with longitudinal directionality is mounted. With continuing reference to the drawings, two magnetic members 18 are mounted on bottom plate 16 preferably facing in the same magnetic direction. As best seen in FIGS. 13A-13C, a plurality of upwardly extending spaced apart fingers 20 form a receiving slot 22 within which a coin shaped magnet 18 is seated and retained. Magnets 18 on bottom plate 16 of inner magnetic member 10 and those on bottom plate 16 of outer magnetic member 12 are arranged such that their complimentary poles are facing. Suitable magnets 18 may be rare earth permanent magnets such neodymium iron boride magnets. However, it should be appreciated that one or more of magnets 18 may be replaced with ferrous materials, such as iron, steel or the like, to magnetically couple with magnets 18.

With specific reference to outer magnetic member 12, a top surface 24 of puck 14 may include a molded handle 26 for comfort and ease of use. More particularly, handle 26 may have an hourglass shape contoured to give ergonomic support to a user's fingers and be textured for better grip. Bottom plate 16 is attached to puck 14 with threaded members 28 such that the orientation of magnets 18 may be aligned with a long axis of handle 26 as shown in FIGS. 11A-11B and 12A-12B or be position transverse to handle 26 as shown in FIGS. 9A-9B and FIG. 10A-10B.

Turning to inner magnetic member 10, bottom plate 16 like that of outer magnetic member 12 is flat but in addition has a non-abrasive, slip-inducing cover 30 such that a user may move inner magnetic member 10 easily along an inner surface of a windshield. The flatness of bottom plate 16 also contributes to easy movement as a windshield usually has some inward curvature such that bottom plate 16 makes only minimal contact with the glass around the periphery of the bottom plate. Outer magnetic member 10 may also have a low friction material on the bottom plate such that it does not scratch the film or the glass. In addition flat bottom plate 16 is slightly elevated because of the curvature of the glass such that it glides over a piece of debris stuck on the glass under the film.

A socket 32 facing forward is provided on top surface 24 of puck 14 for a light 34 which may be an LED. Light 34 is powered by a battery (not shown) housed in a compartment 36 provided on top surface 24. Compartment 36 is aligned with the outer surface of socket 32 to facilitate gripping and movement of inner magnetic member on the inside of the windshield. A light switch 38 such as a push button on/off plunger is provided on the top surface to activate the LED light. Light 34 is embedded in socket 32 for use as described below.

Figure 7:
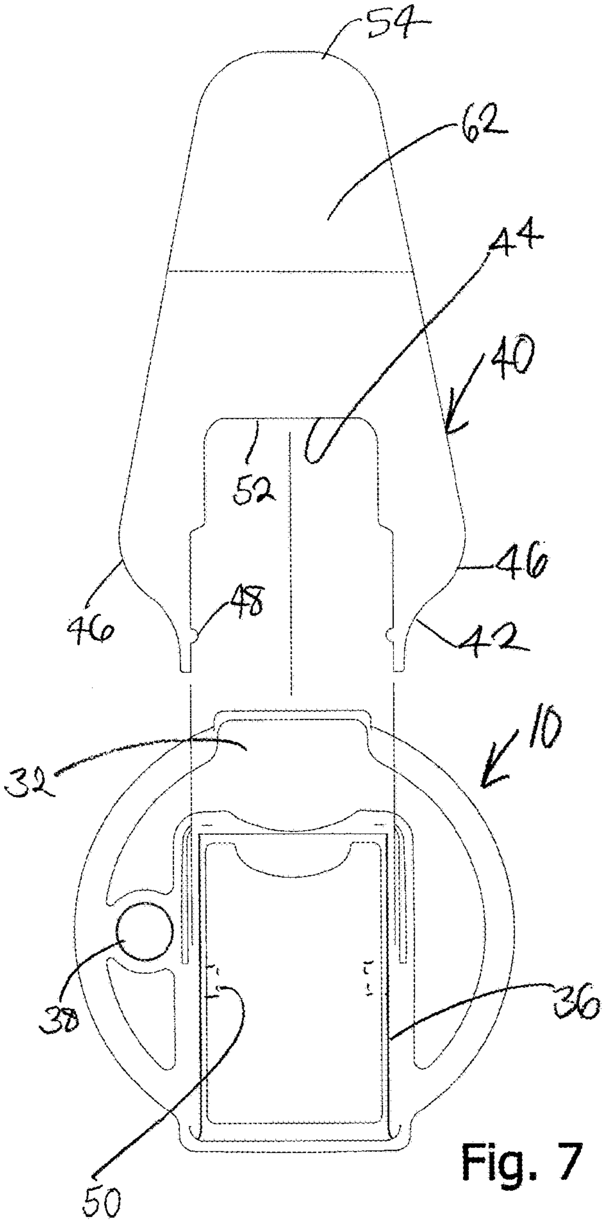
FIG. 7 is a top view of the inner magnetic member shown with a light guide detached.
Figure 8:
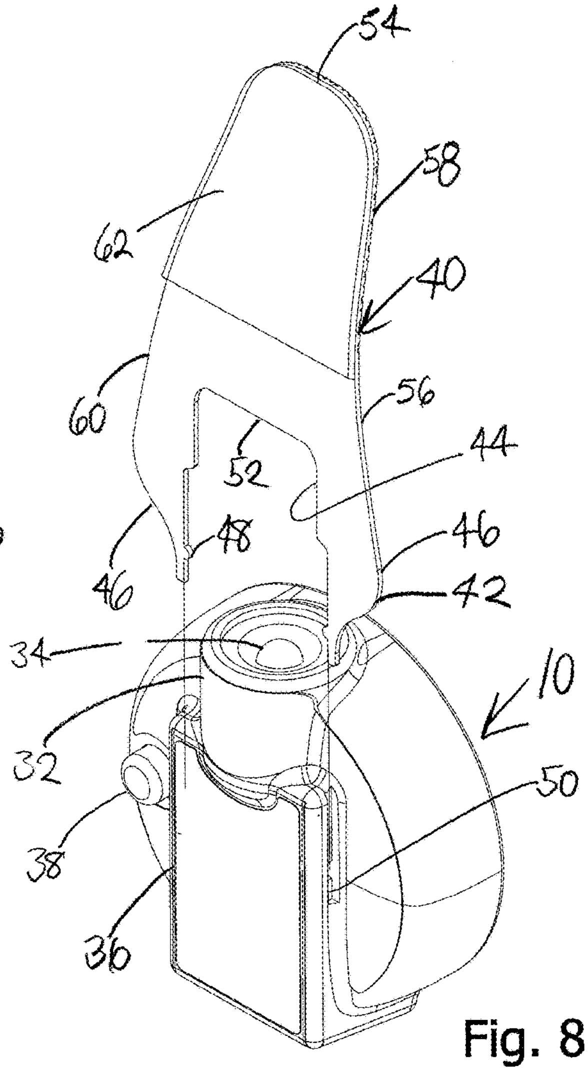
FIG. 8 is a perspective view of the inner magnetic member shown with the light guide detached.
Figure 9A:
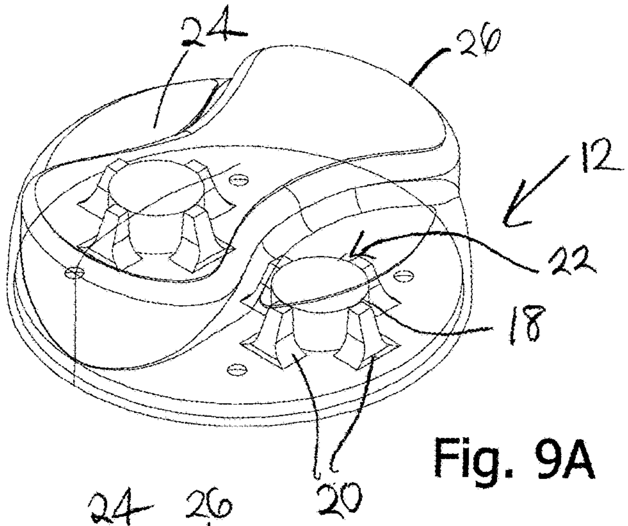
FIG. 9A is an x-ray perspective view of magnets seated on a bottom plate of the outer magnetic member with the magnets positioned transverse a handle.
Figure 9B:
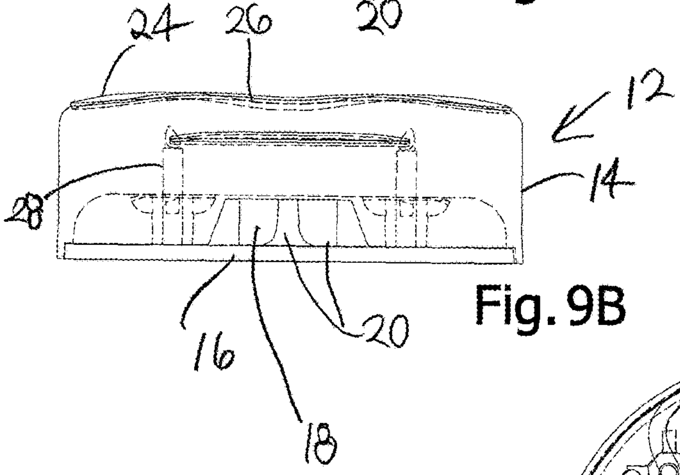
FIG. 9B is an x-ray side view with the magnets positioned transverse the handle.
Figure 10A:
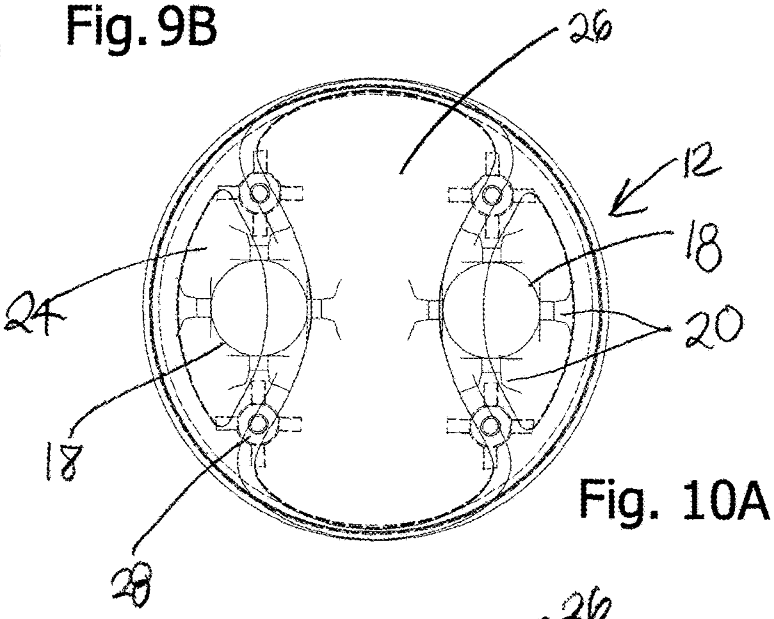
FIG. 10A is an x-ray top view of the magnets seated transverse the handle.
Figure 10B:
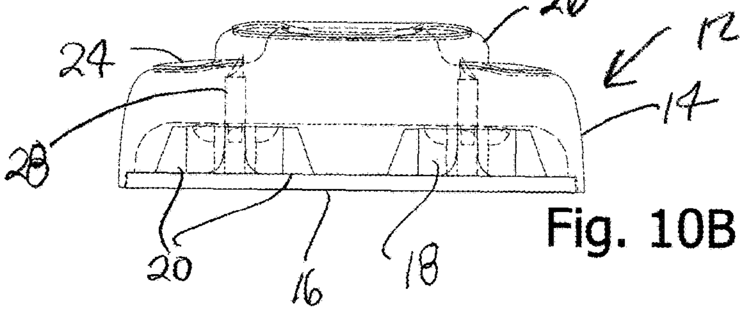
FIG. 10B is an x-ray front view of the magnets seated transverse the handle.
Figure 11A:
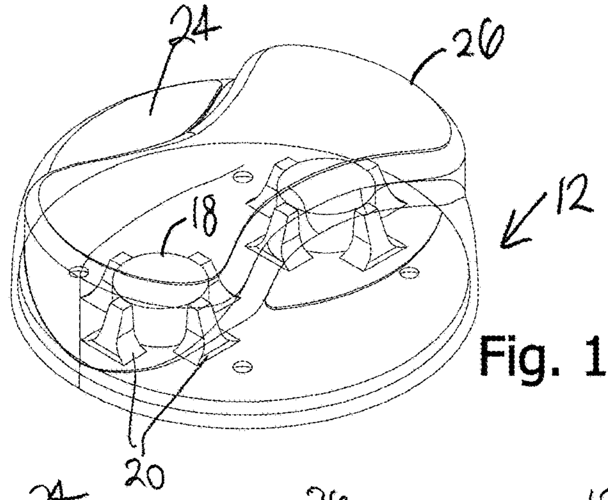
FIG. 11A is an x-ray perspective view of the magnets seat on the bottom plate of the outer magnetic member with the magnets positioned in alignment with the handle.
Figure 11B:
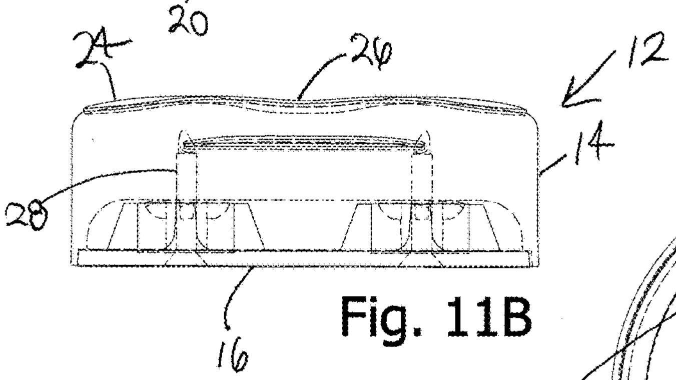
FIG. 11B is an x-ray side view with the magnets seated in alignment with the handle.
Figure 12A:
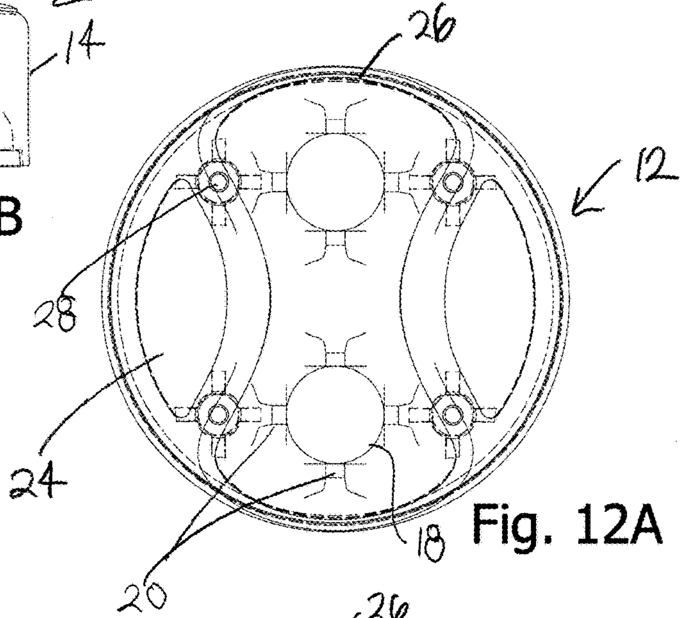
FIG. 12A is an x-ray top view of the magnets seated in alignment with the handle.
Figure 12B:
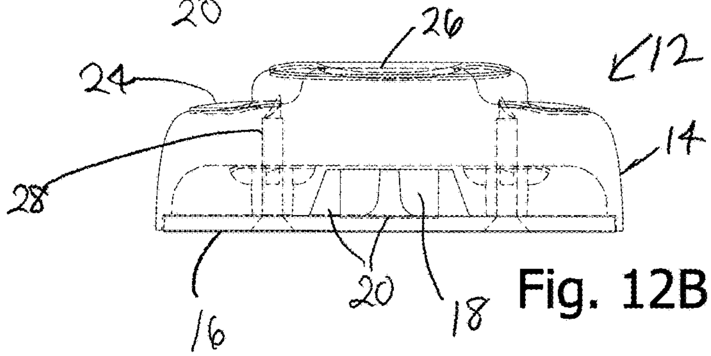
FIG. 12B is an x-ray front view of the magnets seated aligned with the handle.

A light guide 40 best seen in FIGS. 7-8 is formed from a sheet of plastic material mounted on inner magnetic member 10 with a first end 42 positioned in front of light 34. To maximize light flux passed into light guide 40 and onto the windshield, light guide 40 is elongated with a concave recess 44 at first end 42. Wing-like side sections 46 flank concave recess 44. When light guide 40 is detachable side sections 46 include detents 48 which are received in receivers 50 provided in battery compartment 36. Different length light guides 40 may thus be provided depending on the geometry of the window being treated. Flexibility in the light guide is also advantageous for reaching cramped areas such as the bottom of a rear car window. Concave recess preferably has a flat section 52 forming the entrance end of the light guide. Flat section 52 is positioned against socket 32 in close proximity to LED 34 for effective light capture. Side sections 46 also increase light flux. Light 34 may be embedded in light guide 40 or a lens may be positioned between the light and the entrance end of the light guide to minimize light scatter. In other embodiments light 34 may be a laser.

Figure 1:
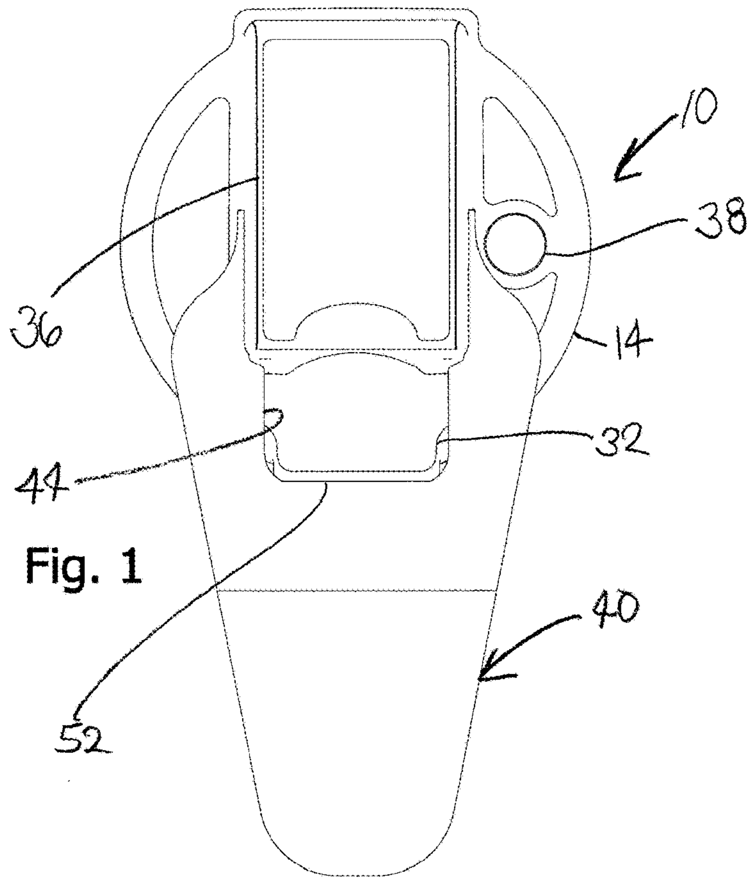
FIG. 1 is a top view of a magnetic light system including inner and outer magnetic members as viewed from the inner magnetic member side.
Figure 2:
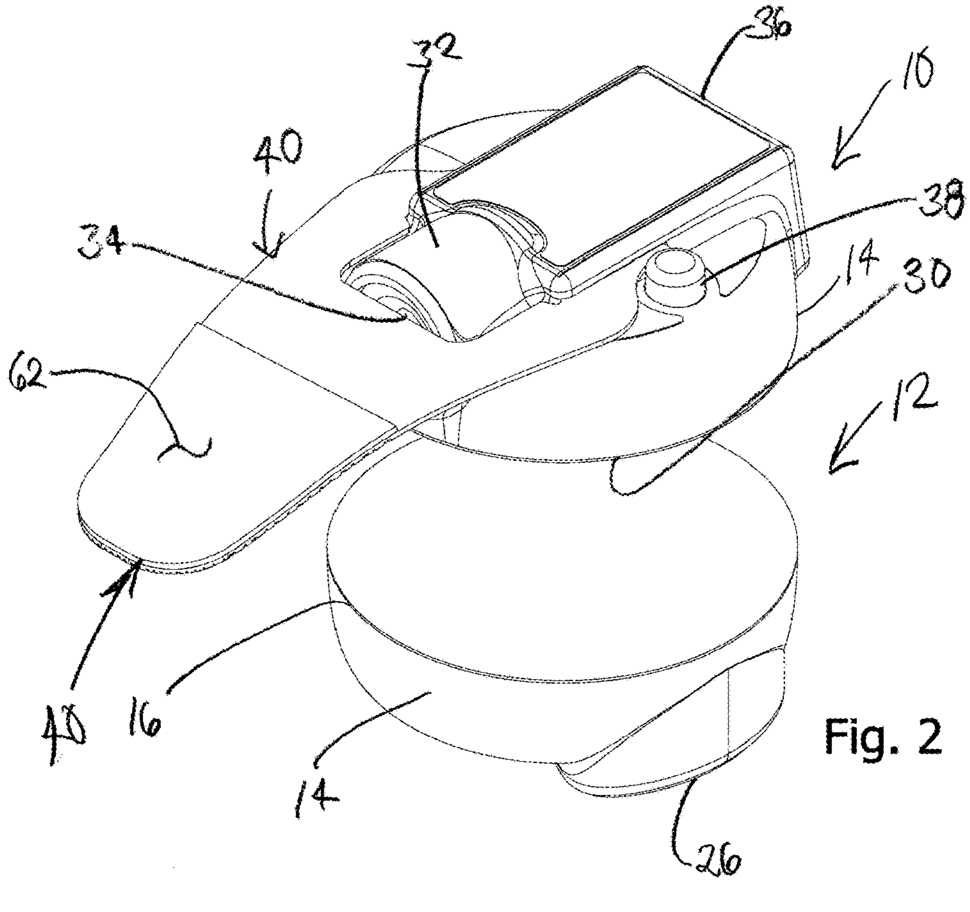
FIG. 2 is an exploded perspective view of the system as viewed from above the inner magnetic member.
Figure 3:
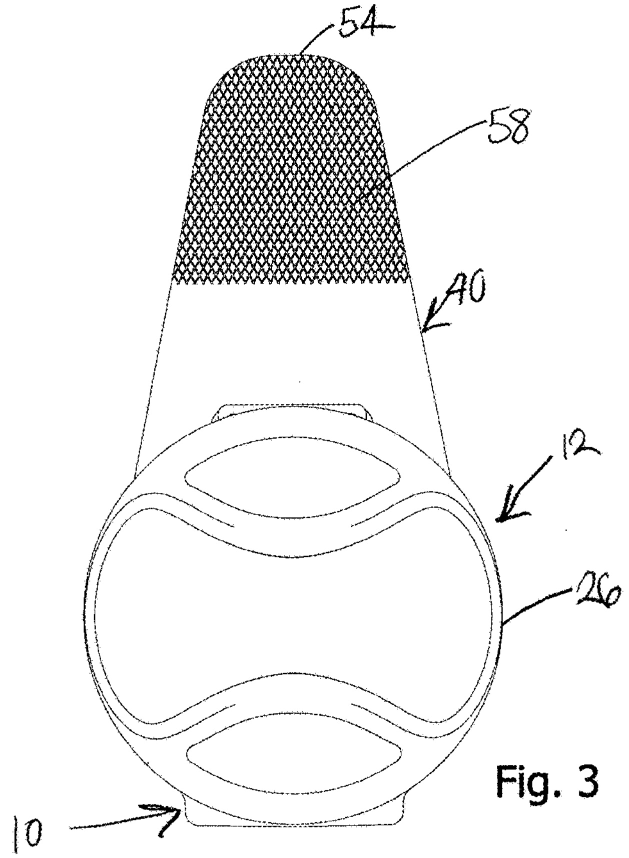
FIG. 3 is a bottom view of the system as viewed from the outer magnetic member side.
Figure 4:
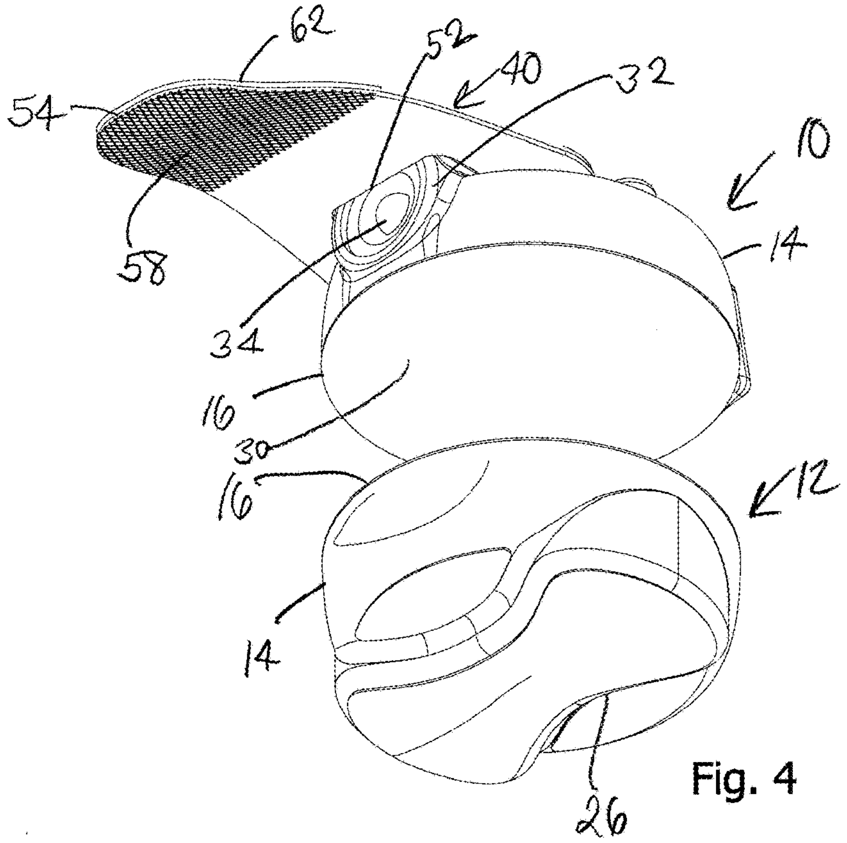
FIG. 4 is an exploded perspective view of the system as viewed from below the outer magnetic member.
Figure 5:
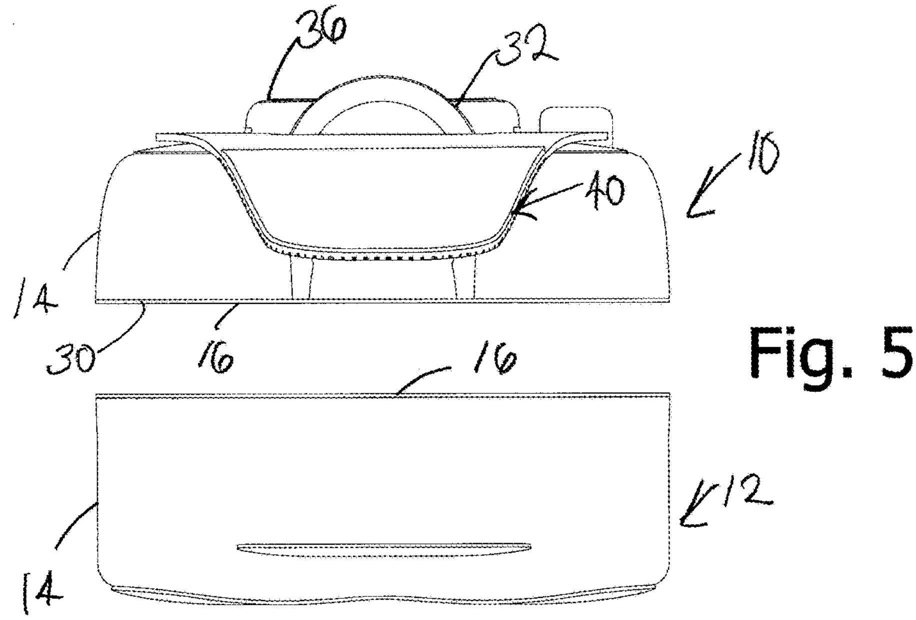
FIG. 5 is a front exploded view of the system.
Figure 6:
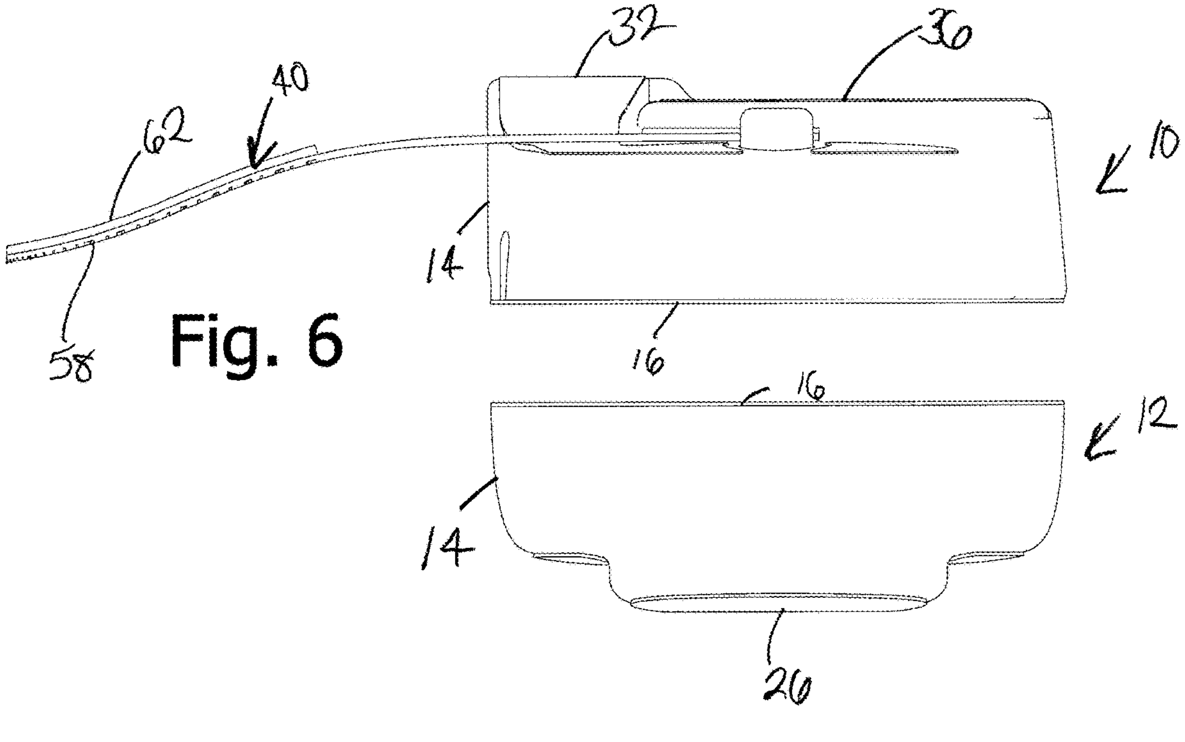
FIG. 6 is a side exploded view of the system.

Light guide 40 tapers towards a second end 54 and may be straight or preferably curved towards a bottom surface 56. Diffuse lines 58 best seen in FIGS. 3-4 are provided at second end 54. Light within the light guide is internally reflected and preferably escapes only through diffuse lines 58. As shown in the drawings, diffuse lines 58 may form of a grid and may be engraved or etched into bottom surface 56. Second end 54 when curved concentrates the light distributed by diffuse lines 58 into a focused beam. A top surface 60 above grid 58 may be coated with a white light reflective surface to reflect the diffused light back into the plate and out bottom surface 56. Reflective surface 62 may be provided in the form of a tape.

Prior to use in the field, inner and outer magnetic members 10, 12 are housed side-by-side as the attraction between the complementary poles of magnets 18 is intense. In use, a tint film 64 may be applied to the outside of a windshield 66 and outer magnetic member 12 may positioned on the film towards a bottom edge of the windshield. Working from the inside inner magnetic member 10 may be brought into magnetic contact with outer magnetic member 12 through the glass and light 34 activated with switch 38.

Figure 14:
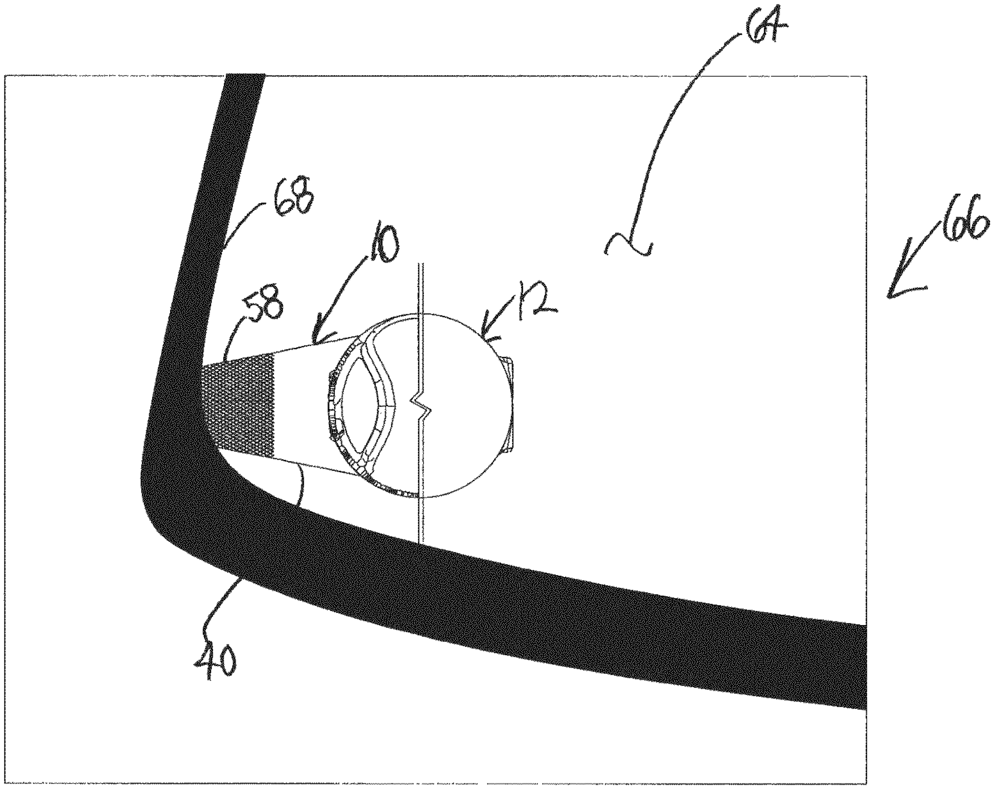

Working from the outside as shown in FIG. 14, a user may move inner magnetic member 10 with outer magnetic member 12 such that a black line 68 that runs around a windshield may be illuminated and the film may be cleanly cut along the line. During use, inner and outer magnetic members 10, 12 slide easily across the inside and outside of the windshield allowing for precise illumination of the black line exactly where the user needs it. The directionality of the magnetic field in inner and outer magnetic members 10, 12 permits a user to rotate the inner member with the outer member as well as precisely move the inner member along the inside of the glass to reach all the black line areas. Cutting shadows are eliminated ensuring a clean, accurate pattern thus avoiding costly miscut errors.

Depending on the handedness of a user or simply preference, magnets 18 in outer magnetic member 10 may be aligned with or transverse to handle 26. This is done by detaching plate 16 from puck 14, rotating the plate a quarter turn and reattaching plate 16 with threaded members 28 as shown in FIG. 11A-11B and FIG. 12A-12B (aligned with handle) and FIG. 9A-9B and 10A-10B (transverse to handle).

As various changes could be made in the above constructions without departing from the scope of the invention, it is intended that all matter contained in the above description or shown in the accompanying drawings shall be interpreted as illustrative and not in a limiting sense.

What is claimed is:

1. A magnetic light system for illuminating a black line around a windshield from an inside of the windshield, said system comprising an inner magnetic member and an outer magnetic member, said inner magnetic member having a light directed into a light guide with first and second ends, said first end of the light guide positioned adjacent the light and a diffuser on a second end of the light guide for illuminating the black line, said inner magnetic member movable along the inside of the windshield from an outside of the windshield by the outer magnetic member.

2. The magnetic light system of claim 1 wherein each of said inner and outer magnetic members has a magnet or plurality of magnets having a magnetic field with longitudinal directionality.

3. The magnetic light system of claim 1 wherein each of said inner and outer magnetic members comprises a hollow body generally cylindrical in shape with a bottom plate on which is mounted a row of magnetic components facing in the same direction, said magnetic components on the inner and outer magnetic members arranged such that their complimentary poles are facing when the bottom plates of the inner and outer magnetic members are on opposite sides of the windshield.

4. The magnetic light system of claim 1 wherein the light is an LED and the light guide is an elongated, tapered member having first and second ends.

5. The magnetic light system of claim 4 wherein the light guide has a concave recess at the first end with a flat section seated in front of the LED, said concave recess flanked by wing-like side sections.

6. The magnetic light system of claim 5 wherein the side sections have detents and the inner magnetic member has receivers whereby the light guide is detachable from the inner magnetic member.

7. A magnetic light system for illuminating a black line around a windshield from an inside of the windshield, said system comprising an inner magnetic member and an outer magnetic member, each of said inner and out magnetic members comprising a hollow puck attached to a bottom plate on which is mounted first and second magnetic members facing in a same direction, said magnetic members on the inner and outer magnetic members arranged such that their complimentary poles are facing when the bottom plates of inner and outer magnetic members are on opposite sides of the windshield;

said inner magnetic member having a socket for an LED facing forward on a top surface aligned with a battery compartment, an elongated, tapered light guide having first and second ends, said first end positioned before the LED and said second end having diffusers on an underside of the light guide;

said outer magnetic member having a top surface with an ergonomically shaped handle;

said inner magnetic member movable along the inside of the windshield from an outside of the windshield by the outer magnetic member.

8. The magnetic light system of claim 7 wherein the bottom plate of the outer magnetic member is attached to the puck with fasteners whereby the first and second magnets may be are aligned parallel or transverse a long axis of the handle.

9. The magnetic light system of claim 7 wherein the diffusers are arranged in a grid.

10. The magnetic light system of claim 9 wherein a reflective surface is attached to a top surface of light guide above the grid.

11. The magnetic light system of claim 7 wherein the light guide has a concave recess at the first end with a flat section seated in front of the LED, said concave recess flanked by wing-like side sections.

12. The magnetic light system of claim 11 wherein the side sections have detents and the battery compartment has receivers whereby the light guide is detachable from the inner magnetic member.

* * * * *